United States Patent
Crain et al.

(10) Patent No.: US 7,707,733 B1
(45) Date of Patent: May 4, 2010

(54) LEVEL VIAL SUPPORT FOR A GEOMATICS POLE

(75) Inventors: Stephen B. Crain, Cape Girardeau, MO (US); Ralph C. Mize, Jonesboro, IL (US)

(73) Assignee: SECO Manufacturing Company, Inc., Sunnyvale, CA (US)

( * ) Notice: Subject to any disclaimer, the term of this patent is extended or adjusted under 35 U.S.C. 154(b) by 144 days.

(21) Appl. No.: 11/966,441

(22) Filed: Dec. 28, 2007

(51) Int. Cl.
*G01C 15/06* (2006.01)
*G01C 9/28* (2006.01)

(52) U.S. Cl. .......................................... 33/295; 33/373
(58) Field of Classification Search ............... 33/295, 33/370, 371, 372, 373, 379; 81/177.4, 490
See application file for complete search history.

(56) References Cited

U.S. PATENT DOCUMENTS

| | | | | |
|---|---|---|---|---|
| 722,899 | A * | 3/1903 | Reeder | 81/490 |
| 1,712,343 | A * | 5/1929 | Gerhardt | 81/490 |
| 2,715,028 | A * | 8/1955 | Dossie | 81/177.4 |
| 5,025,568 | A * | 6/1991 | Grimes | 33/371 |
| 5,459,934 | A * | 10/1995 | Heroux | 33/373 |
| 6,279,434 | B1 * | 8/2001 | Brown | 81/490 |
| 6,772,526 | B1 * | 8/2004 | Crain et al. | 33/295 |
| 6,901,681 | B2 * | 6/2005 | Bueno | 33/647 |
| D579,360 | S * | 10/2008 | Crain et al. | D10/74 |
| 7,530,174 | B1 * | 5/2009 | Kimball et al. | 33/373 |
| 2003/0226941 | A1 | 12/2003 | Crain | |
| 2003/0235459 | A1 | 12/2003 | Crain | |
| 2005/0151035 | A1 | 7/2005 | Crain | |
| 2006/0231714 | A1 | 10/2006 | Crain | |
| 2006/0233601 | A1 | 10/2006 | Crain | |

FOREIGN PATENT DOCUMENTS

JP 11193804 A * 7/1999
JP 2000155027 A * 6/2000

* cited by examiner

*Primary Examiner*—R. A. Smith
(74) *Attorney, Agent, or Firm*—Senniger Powers LLP

(57) ABSTRACT

A support unit for a level indicator capable of being mounted on a geomatic pole, such as a prism pole or a GPS pole. A housing of the support unit is mounted on the geomatic pole. A first holder in the housing holds the level indicator and a second holder holds a tool, such as a stylus or a hex wrench, for use along with of the support unit. The level indicator is pivotally adjustable with respect to the housing for alignment with the geomatic pole when mounted thereon.

12 Claims, 12 Drawing Sheets

LEVEL VIAL SUPPORT FOR A GEOMATICS POLE

FIELD OF THE INVENTION

The present invention generally relates to levels and more particularly to a level vial support for mounting on a geomatics pole.

BACKGROUND

While executing land surveys, surveyors commonly use a wide variety of equipment (e.g., a radio, a hammer, a chisel, survey stakes or other markers). Thus, surveyors must carry with them numerous items. While some pieces of surveying equipment are quite large, such as total stations, tripods, or poles, other pieces of surveying equipment, such as styluses, pencils, and hex wrenches (sometimes called Allen wrenches), are quite small.

Throughout a survey, surveyors are prone to misplace and lose their small pieces of equipment. Surveyors traverse a wide variety of terrain often in remote locations. For example, surveyors commonly survey grassy, forested, mountainous, or even snow-covered terrain. In all such types of terrain, surveyors are unlikely to find a small tool once it has been misplaced or dropped.

Surveying tools such as styluses, pencils, and hex wrenches are small, and losing such tools while in the field can be detrimental to a land survey. If, for example, a surveyor loses his hex wrench, he will be unable to calibrate a level vial when it needs adjustment. Unless the surveyor decides to sacrifice the accuracy of his measurements, the surveyor must leave the field to retrieve a replacement hex wrench, assuming that he happens to have a replacement readily available.

As a result, it would be advantageous for surveyors to have a dependable location to safely stow and transport small tools. Throughout a survey, surveyors commonly use different types of geomatics poles (e.g., a prism pole, a global positioning satellite (GPS) pole), and these poles commonly have a level vial support with a bubble vial to facilitate the vertical collimation of the device over a certain point. Given the convenient location of the level vial support along the length of the pole, it would be advantageous for surveyors to be able to stow various small tools on the level vial support. Surveyors could then safely transport their small tools into the field, stow the tools in a convenient location while in the field, and safely carry the tools out of the field, all as one unit with the level vial support and, if desired, with the pole.

SUMMARY

In one aspect of the present invention, a level vial support capable of stowing a tool and being mounted on a geomatics pole generally comprises a housing adapted for mounting on the geomatics pole. A first holder associated with the housing is sized and shaped for holding a level indicator, and a second holder associated with the housing is adapted for receiving and holding the tool. The second holder comprises a receptacle extending into the housing, the receptacle being sized and shaped to receive at least a majority of the tool.

In another aspect of the invention, a level vial support generally comprises a housing adapted for mounting on the geomatics pole. The housing comprises a top, a bottom, sides, and a lateral axis extending through opposite ones of the sides. A first holder associated with the housing is sized and shaped for holding a level vial. Further, a second holder associated with the housing is capable of securing and holding the tool parallel to the lateral axis of the housing.

In still another aspect of the invention, a level vial support capable of stowing a tool and being mounted on a geomatic pole generally comprises a housing adapted for mounting on the geomatic pole. A first holder associated with the housing sized and shaped for holding a level indicator has a top and a bottom. The level indicator is mounted in the first holder for selective pivoting relative to the holder. An adjusting device can adjust the level vial indicator relative to the housing to achieve a desired alignment with a longitudinal axis of the geomatic pole when the housing is mounted thereon. The adjusting device is accessible from the top surface of the first holder.

In a further aspect of the invention, a level vial support generally comprises a housing adapted for mounting on the geomatics pole. A first holder associated with the housing is sized and shaped for holding a level vial. An attachment sleeve formed separately from the housing is secured to the housing for attaching a shoe.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE DRAWINGS

Figure 1:
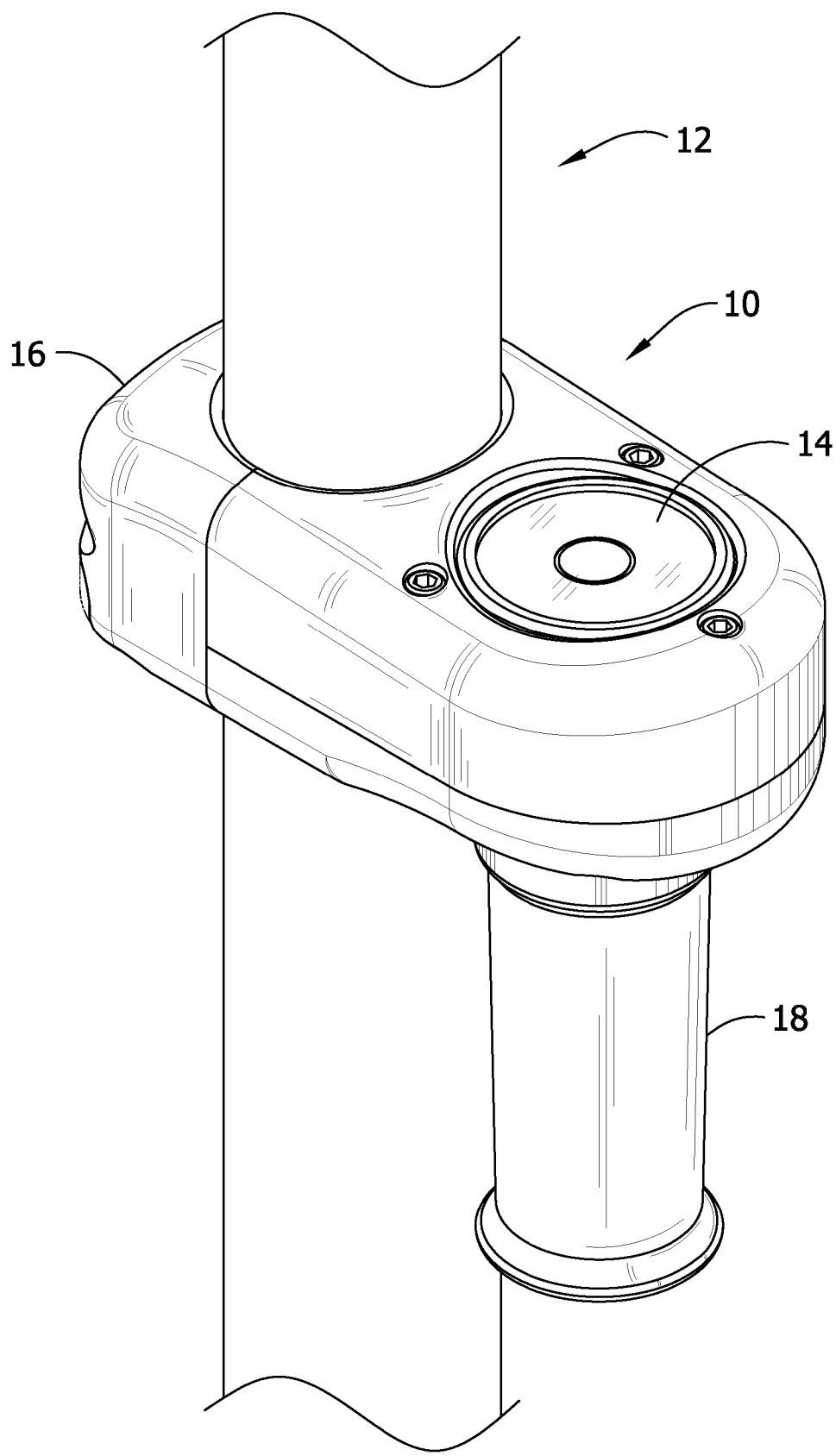
FIG. 1 is a top perspective of a level vial support attached to a geomatics pole, only a fragmentary portion of the geomatics pole being shown.

With reference to FIG. 1, a level vial support, generally indicated at 10, is shown attached to a geomatics pole, generally indicated at 12, such as a prism pole or a global positioning satellite (GPS) system pole. As is known in the art, such geomatics poles can be used to take measurements of locations (e.g., ground points) during a survey, such as a survey of land. For the measurements to be accurate, the geomatics pole 12 must be vertically collimated before the measurements are taken. The level vial support 10 of the present invention attaches to and facilitates the vertical collimation of the geomatics pole 12. It is understood that the level vial support 10 could be adapted to attach to other types of geomatics target devices.

The illustrated geomatics pole 12 has a circular transverse cross section. The top of the geomatics pole (not shown) is generally adapted to receive a geomatics target (not shown), such as a prism or a GPS target, for allowing measurements to be taken using the geomatics pole 12. It is understood that the geomatics pole 12 can have a different cross-sectional shape (e.g., square, rectangular).

Referring to FIGS. 2-8, the level vial support 10 comprises a bubble vial 14 (broadly, a "level indicator"), a body, generally indicated at 16, that holds the bubble vial 14, and a shoe 18, that extends outward from the body. The body 16 includes a lower housing member 20, an upper housing member 22, and a side housing member 24. In the illustrated embodiment, all of the housing members are formed separately. It is to be understood that the body 16 could be formed by more than the three pieces illustrated herein, or by one or two pieces.

The lower housing member 20, the upper housing member 22, and the side housing member 24 all have an engagement surface (designated at 20A, 22A, and 24A, respectively) shaped in close correspondence to the circumferential shape of the geomatics pole 12. An elastomeric pad 25 is assembled onto the side housing member 24 and defines the engagement surface 24A (shown in FIGS. 2 and 3) such that the high friction elastomeric pad engages the geomatics pole 12 to provide gripping action to hold the level vial support 10 in position. The lower housing member 20 and the upper housing member 22 are free of any such material on their engagement surfaces (20A and 22A, respectively) so that, when attached to the geomatics pole 12, the engagement surfaces 20A and 22A precisely locate the level vial support 10 relative to the geomatics pole 12. In particular, the center axis of a holder for the bubble vial (described in further detail below) is made parallel with the longitudinal axis of the geomatics pole 12, as is required for the bubble vial 14 to accurately indicate when the geomatics pole 12 is in a vertical orientation. It is to be understood that other ways of securing and orienting the level vial support 10 may be used within the scope of the present invention.

Figure 2:
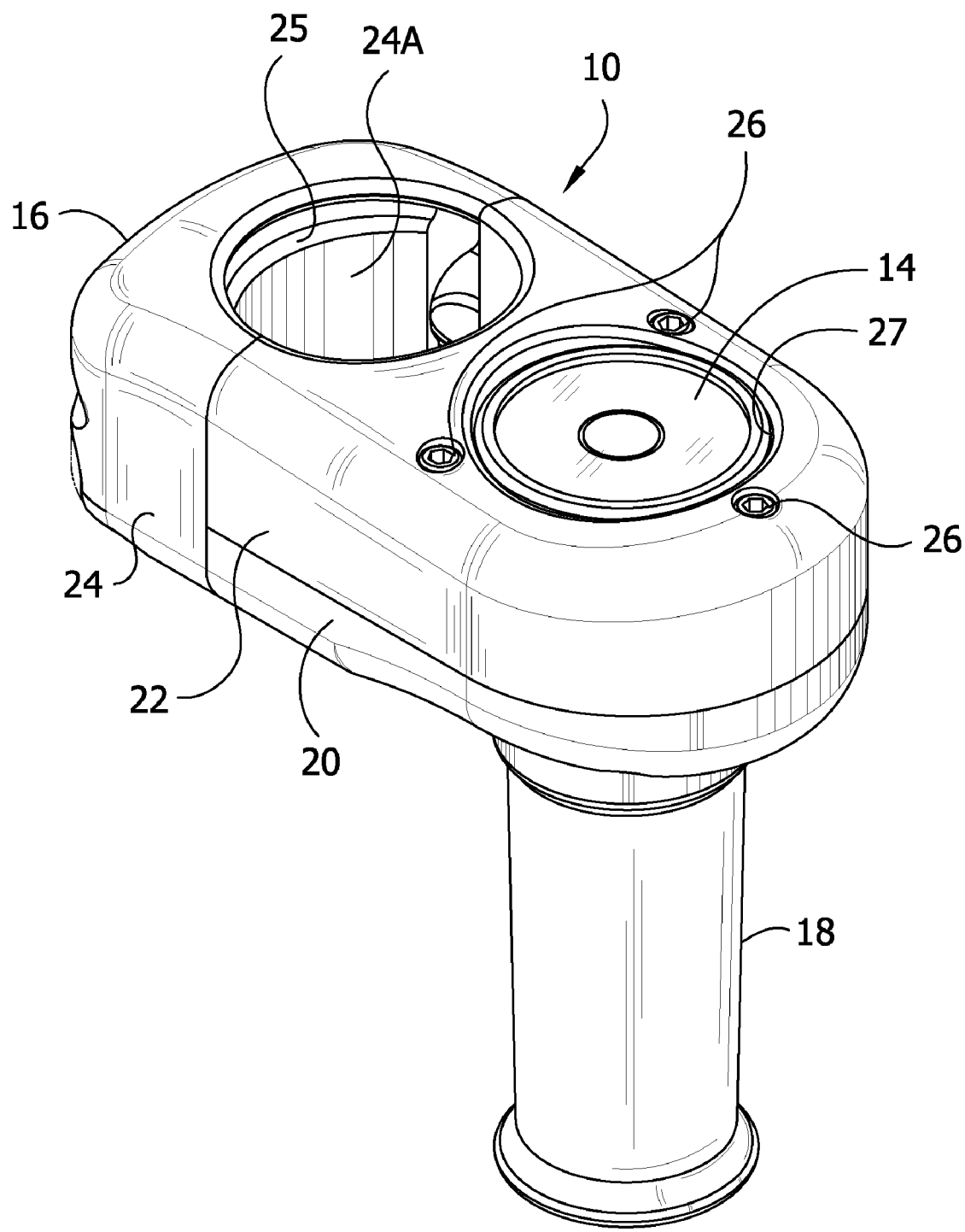
FIG. 2 is a top perspective of the level vial support removed from the geomatics pole.
Figure 3:
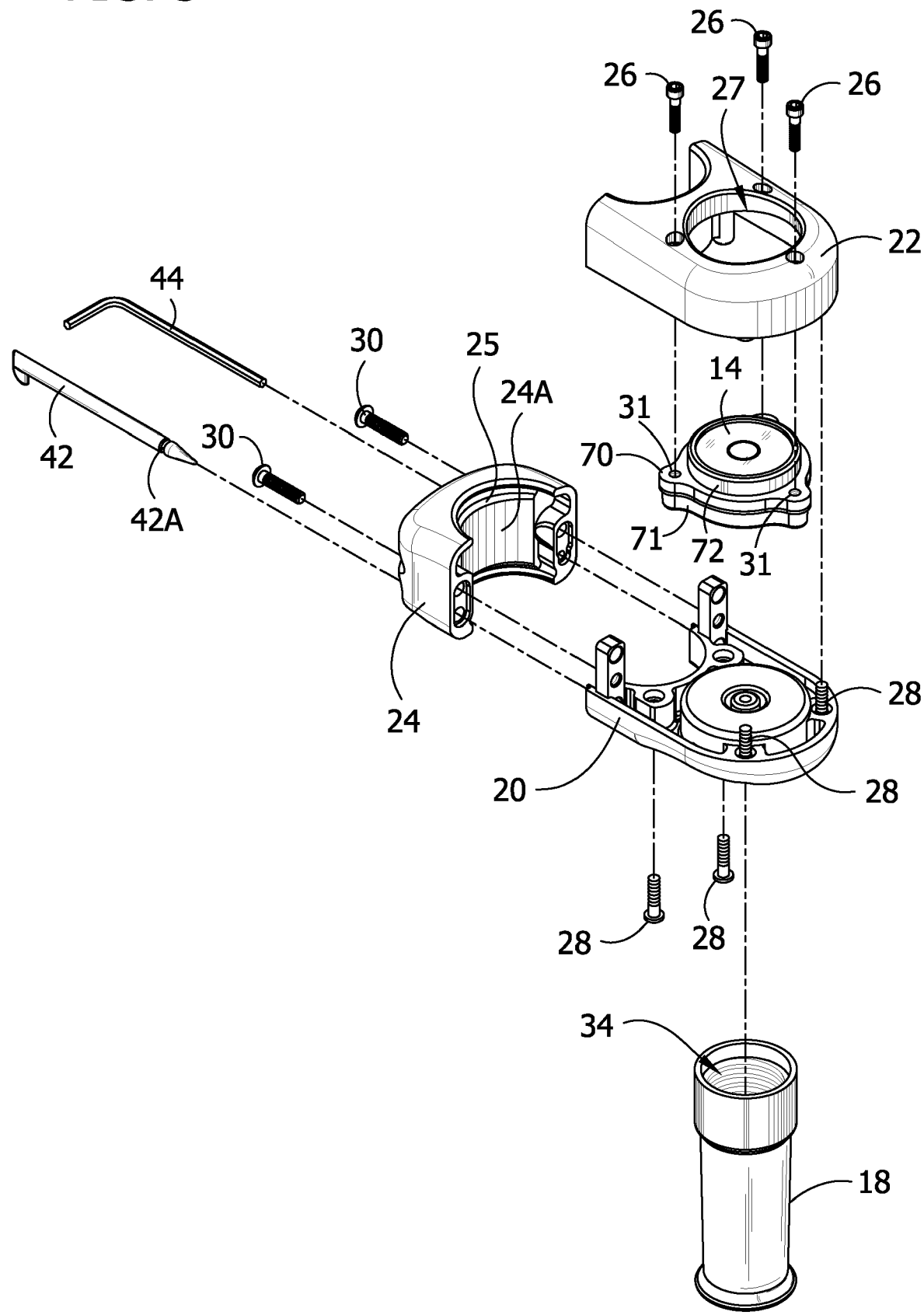
FIG. 3 is an exploded top perspective thereof.
Figure 5:
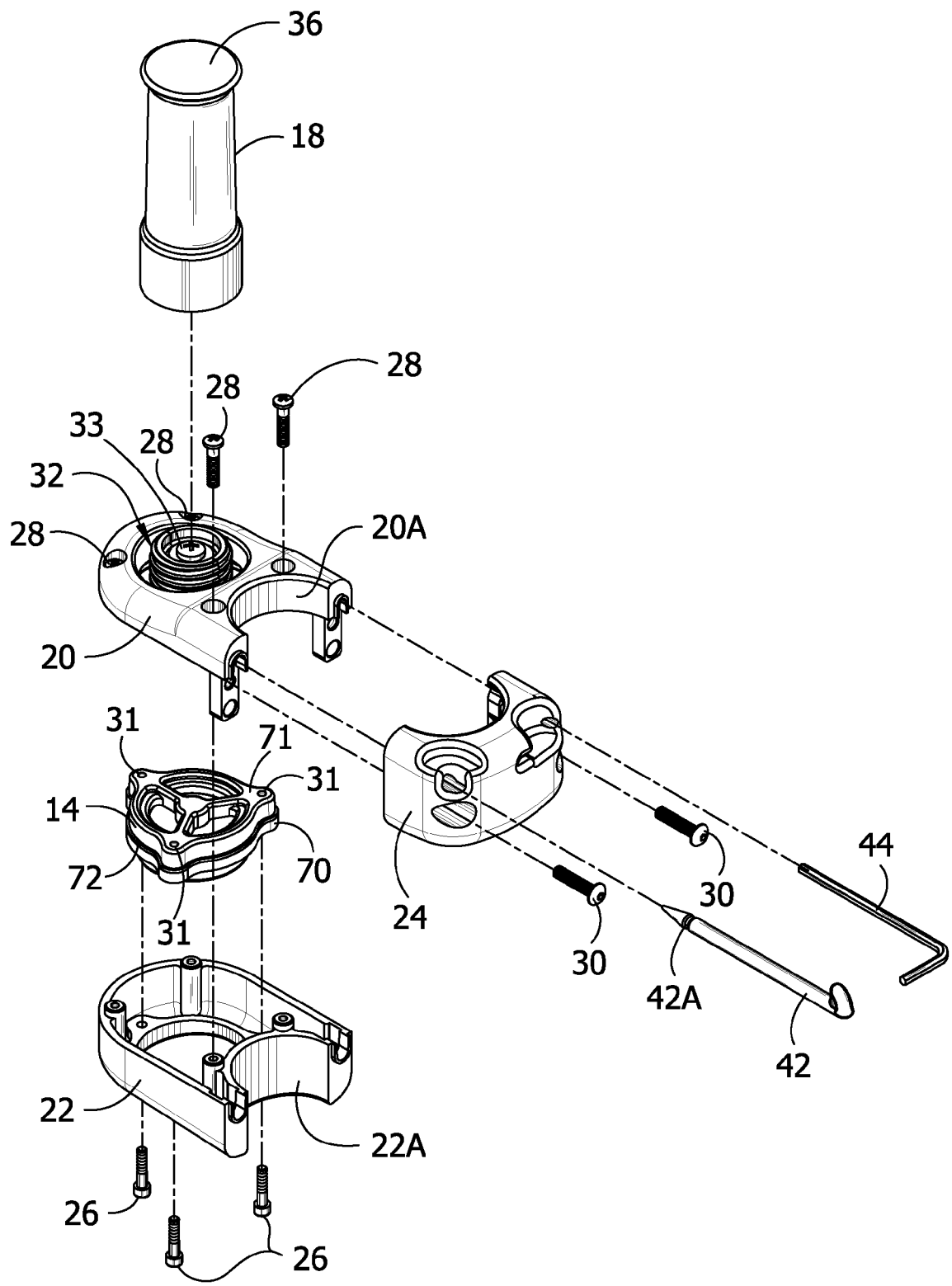
FIG. 5 is an exploded bottom perspective thereof.

The lower housing member 20 and the upper housing member 22 form a holder between them in which the bubble vial 14 is enclosed (shown in the exploded views of FIGS. 3 and 5). As illustrated in FIG. 2, the bubble vial 14 fits snuggly between the lower and upper housing members 20, 22 to restrict movement of the bubble vial 14 (e.g., canting, sliding) with respect to the lower and upper housing members 20, 22. The top of the bubble vial is clearly visible through an aperture 27 in the upper housing member 22. In addition, the upper housing member 22 has three openings through which three fasteners 26 (e.g., hex head screws) pass to further secure the level vial. The fasteners 26 also enable pivoting adjustment of the bubble vial 14 to achieve proper alignment with the longitudinal axis of the geomatics pole 12. The fasteners 26 pass through the openings in the upper housing member 22 and engage the periphery of the level vial 14 at threaded bores 31. The periphery of the level vial 14 includes a top ring 70, bottom ring 71 and an inner attachment ring 72 located between the top and bottom rings (see FIGS. 9 and 10). The top ring 70 is connected to the center of the bubble vial 14 via the attachment ring 72 and is resiliently deformable. Turning the fasteners 26 within the threaded bores 31 either pulls the attachment ring 72 toward the head of the fastener or moves the attachment ring away from the head of the fastener. The top ring 70 can deform or expand to accommodate this motion, and the resiliency of the ring serves to hold the vial securely in its selected position. The rotation of the fasteners 26 within the threaded bores 31 causes pivotal movement of the level vial 14 within the upper and lower housing members 22, 20. As each individual fastener 26 is loosened or tightened within the respective bores 31, the portion of the level vial 14 associated with each particular fastener lowers or raises. It will be understood that the fasteners 26 can be used to adjust the horizontal orientation of the level vial 14. This top-side adjustment can be used to more easily align the level vial 14 with the longitudinal axis of the geomatics pole 12. In the illustrated configuration, the bubble vial has a width of about 1-inch (i.e., 1-inch diameter) but it is to be understood that the bubble vial 14 can have different sizes. It is also to be understood that different types and configurations of level indicators besides the illustrated bubble vial 14 can be used.

As shown in FIGS. 3 and 5, the lower housing member 20 and the upper housing member 22 are secured together by four fasteners 28 (e.g., screws). In addition, the upper housing member 22 and the side housing member 24 are secured together by two fasteners 30 (e.g., screws) (also shown in FIG. 6). It is contemplated that the housing members 20, 22, 24 can be secured together with a different number or configuration of fasteners and can be secured in other ways (e.g., bonding). In assembly, the upper housing member 22 is secured to the lower housing member 20, enclosing the bubble vial 14 between the two housing members 20, 22. The connected housing members 20, 22 are then placed on one side of the geomatics pole 12, and the side housing member 24 is placed on the other side of the geomatics pole 12 diametrically opposite the other housing members 20, 22. Fasteners 30 are passed through the side housing member 24 and into the upper housing member 22 and tightened to clamp all of the housing members 20, 22, 24 onto the geomatics pole 12 so that the bubble vial 14 is held in a fixed position on the geomatics pole 12.

Figure 9:
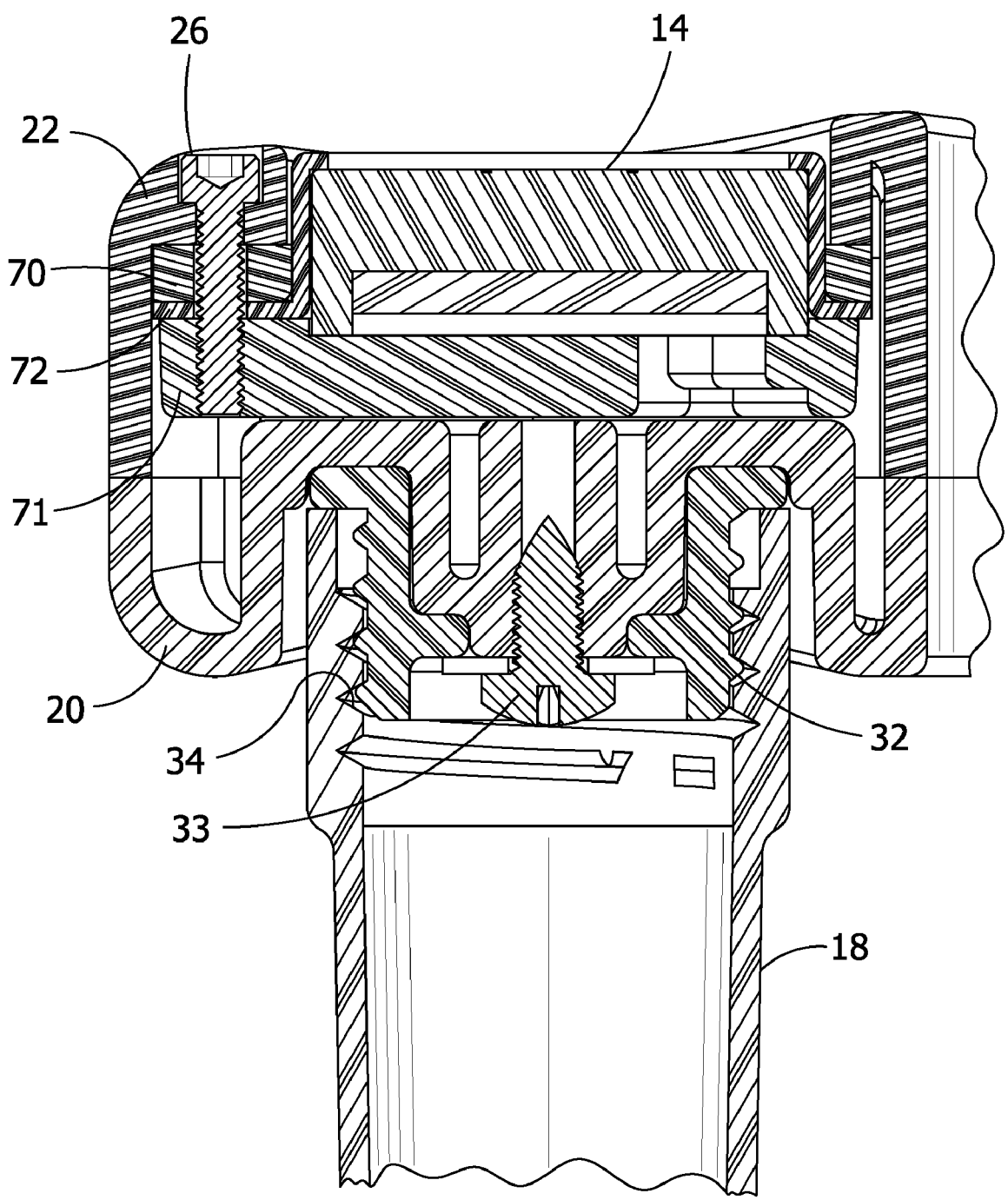
FIG. 9 is a cross-section of the level vial support.
Figure 10:
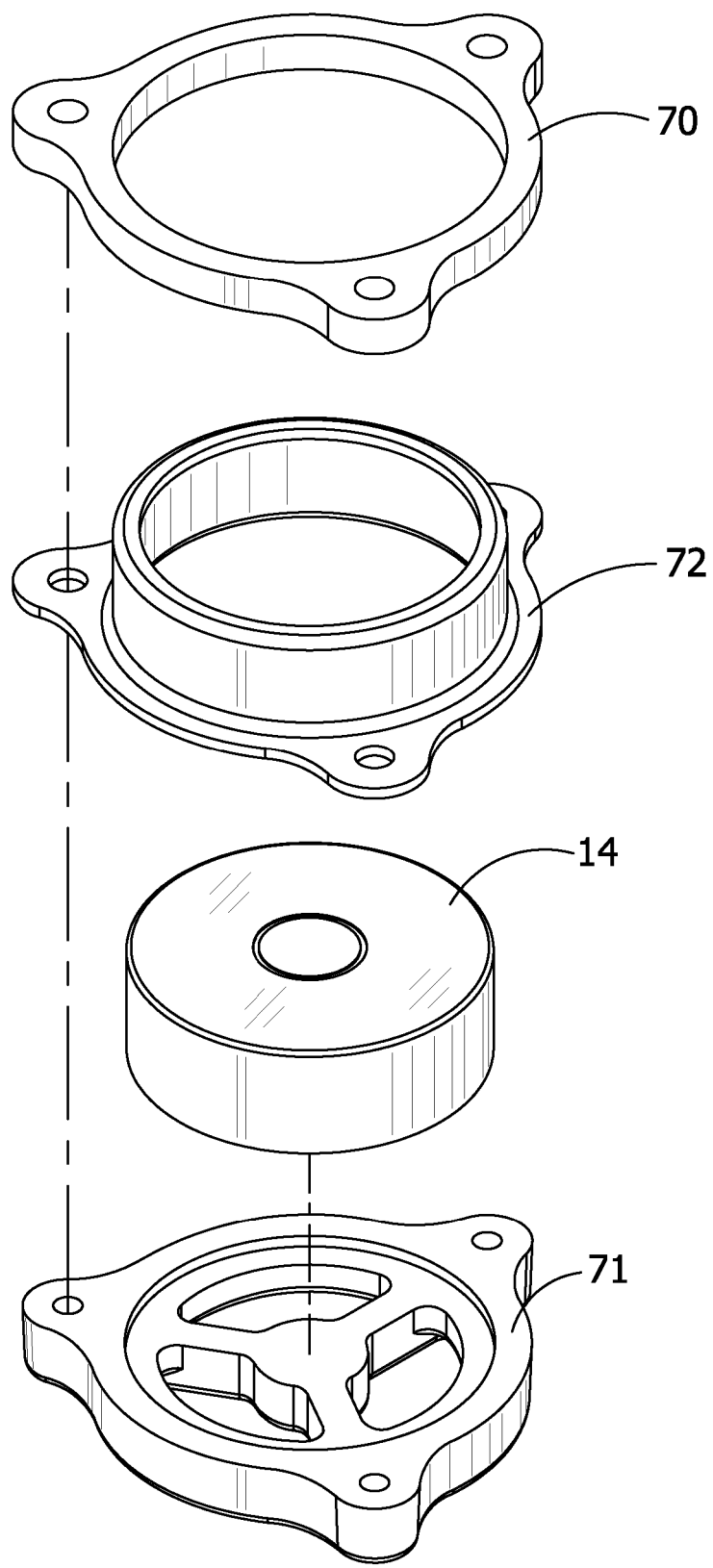
FIG. 10 is an exploded view of the level vial.

As shown in FIGS. 5 and 9, the bottom side of the lower housing member 20 has a threaded attachment sleeve 32. The attachment sleeve is a separate structure from the housing member 20, and is attached to the housing member by a screw 33. The shoe 18 that has corresponding internal threads 34 (shown in FIG. 3) can be screwed and temporarily stowed thereon without causing additional stress on the housing 20 that could alter the housing orientation with respect to the pole 12. The shoe 18 may be removed and used to cover the point (not shown) at the bottom of the geomatics pole 12 when surveying softer terrain to support the geomatics pole 12 above the ground. More specifically, the shoe 18 has a flat bottom 36 (shown in FIGS. 4 and 5) with a surface area that is selected to distribute the weight of the geomatics pole 12 to prevent the point from sinking into the ground. The shoe 18 can also be used to sheath the point during transport to protect the tip and personnel.

Figure 4:
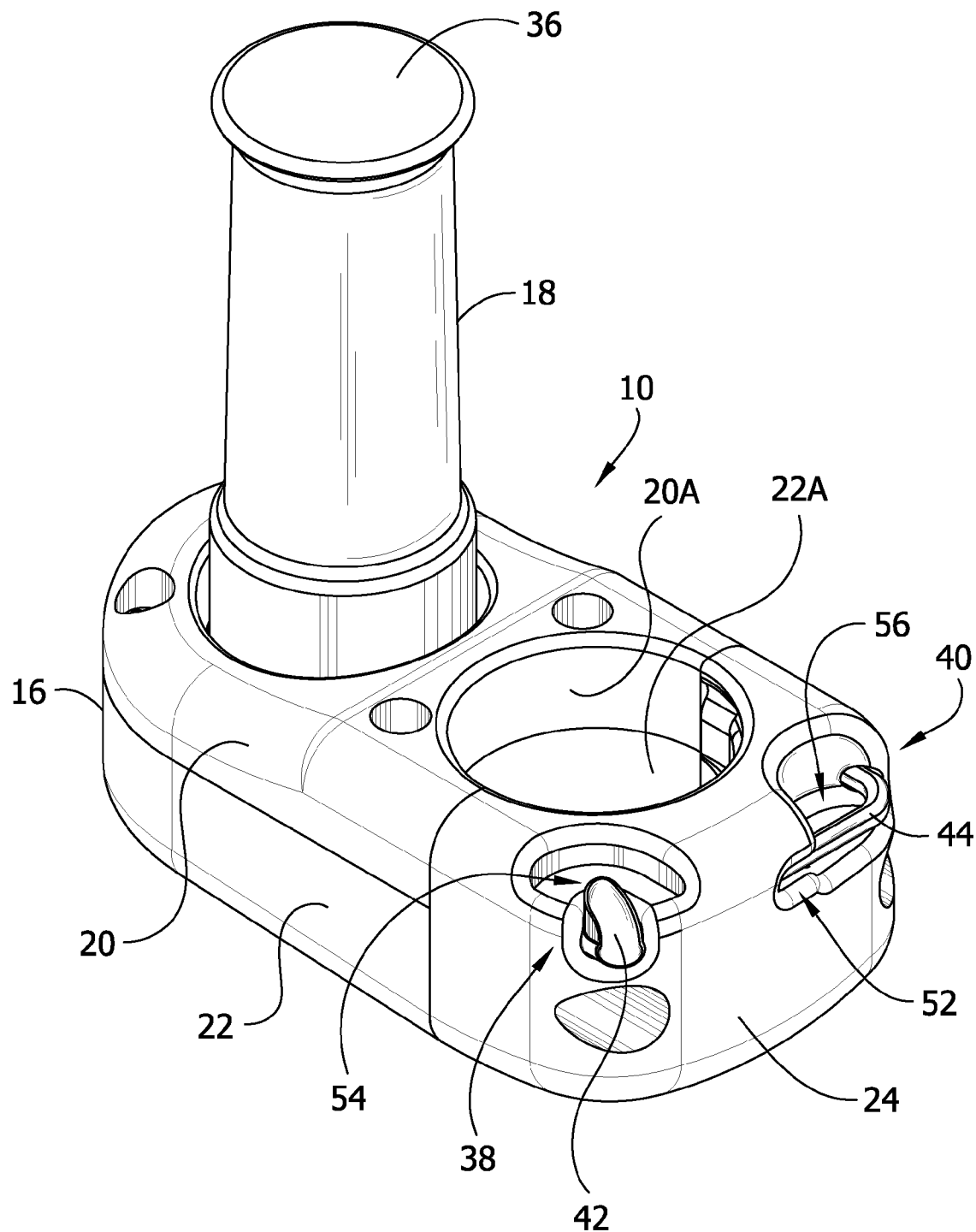
FIG. 4 is a bottom perspective of the level vial support.
Figure 6:
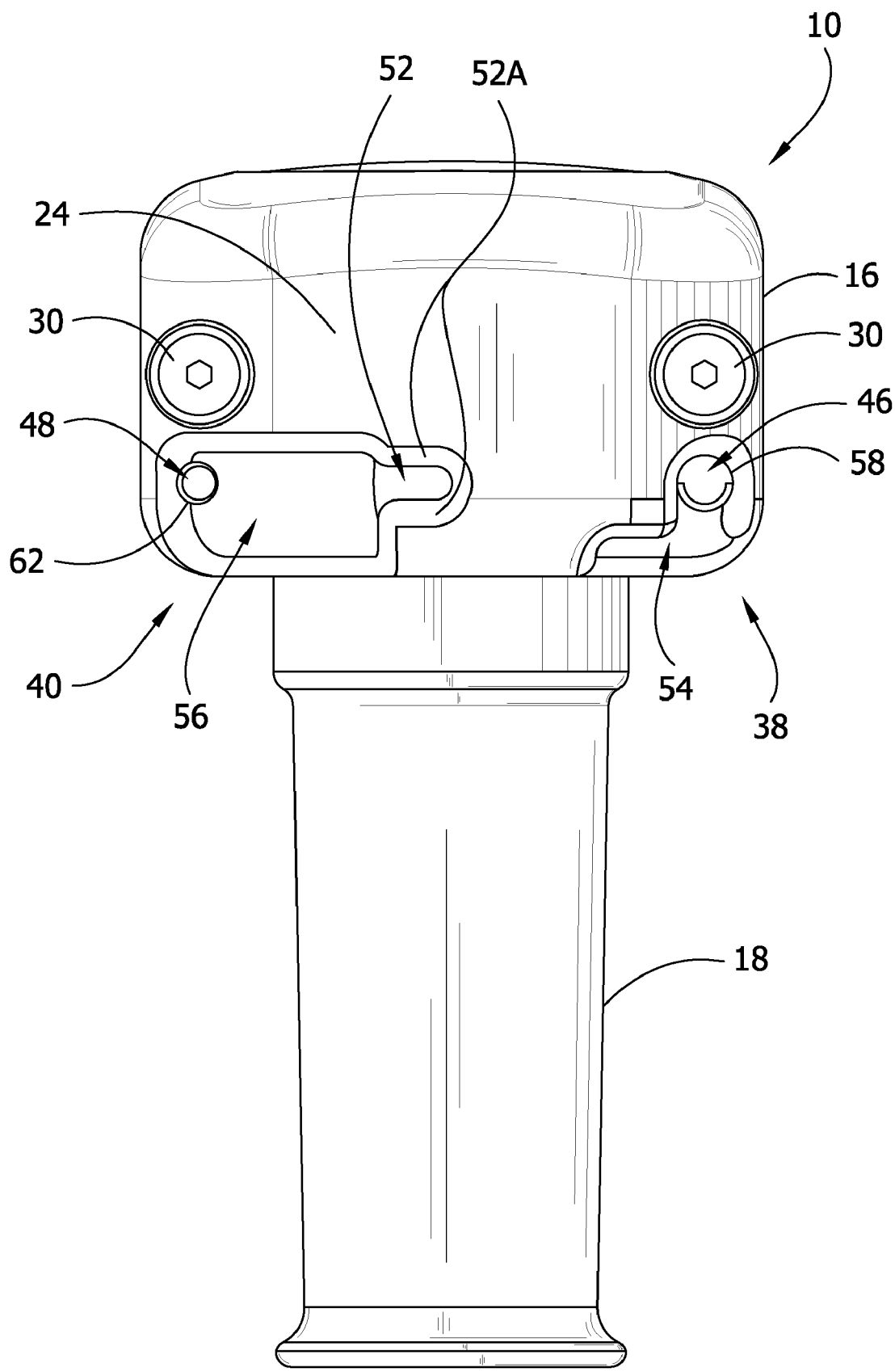
FIG. 6 is an enlarged back side elevation of the level vial support with a stylus and a hex wrench held by the support removed.
Figure 7:
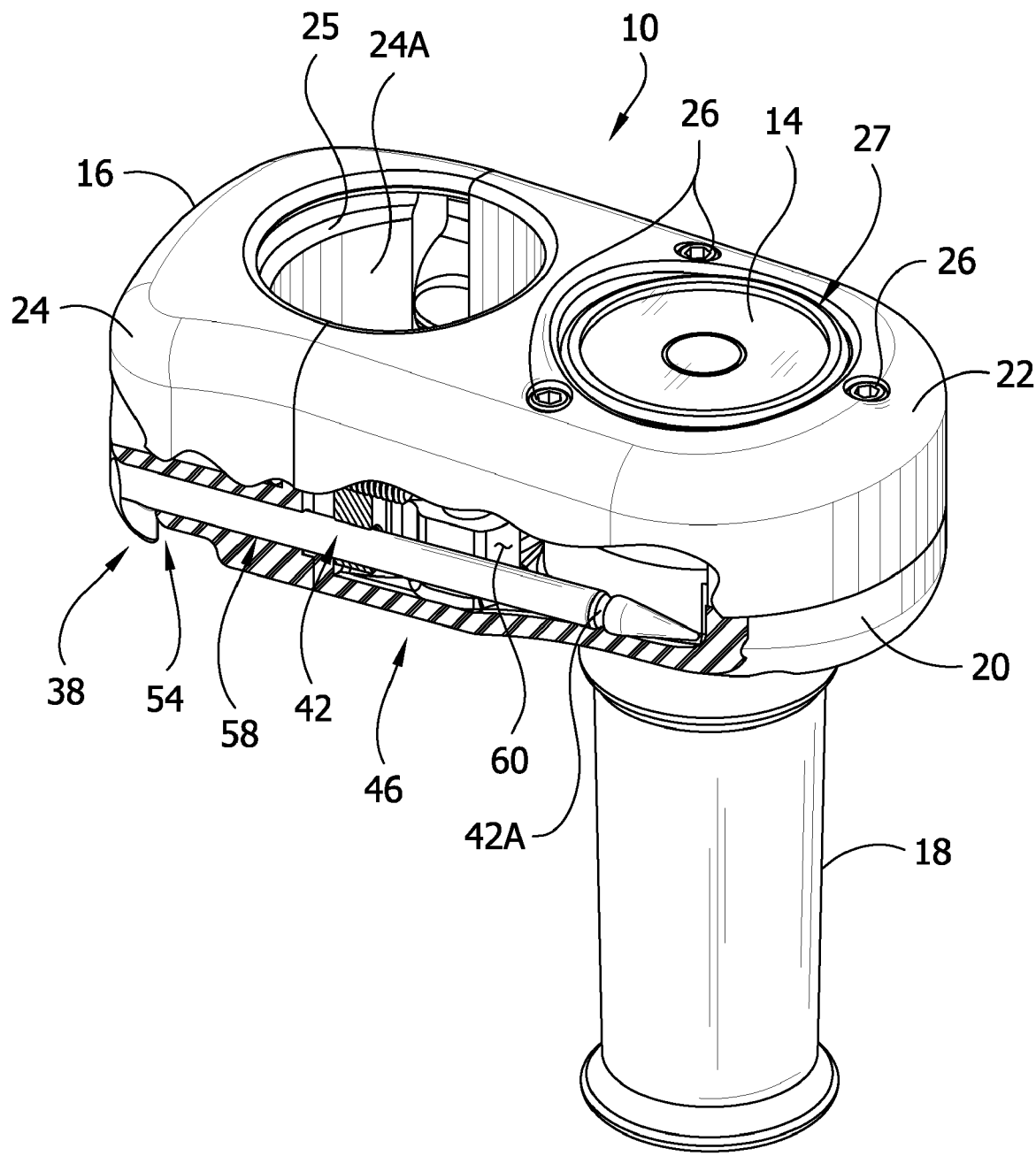
FIG. 7 is a top perspective with a section broken away to reveal the disposition of the stylus within the level vial support.
Figure 8:
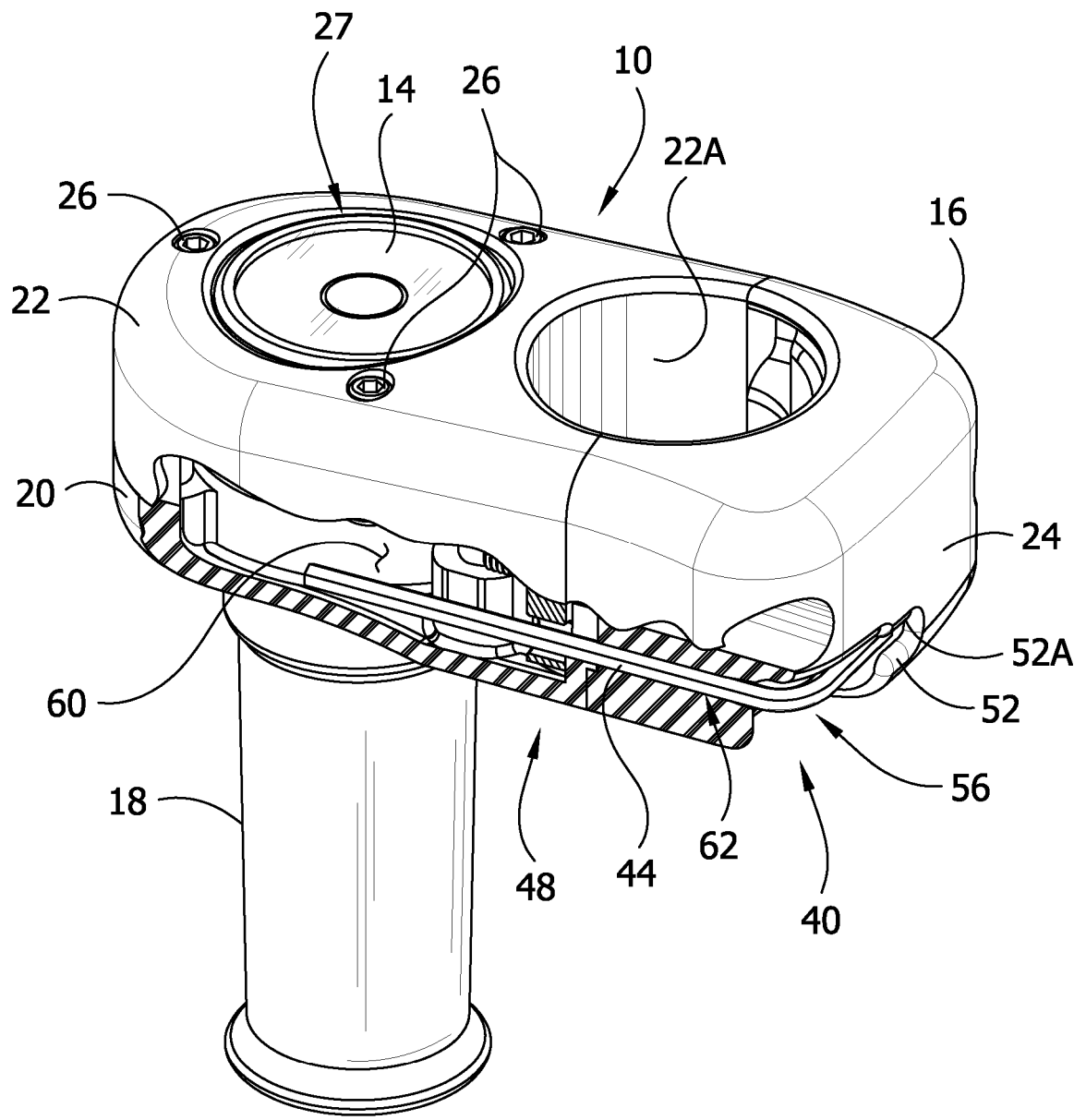
FIG. 8 is a top perspective similar to FIG. 6, but from the opposite side, with a section broken away to reveal the disposition of the hex wrench within the level vial support.

As illustrated in the bottom perspective view of FIG. 4, the enlarged view of FIG. 6, and in the views with parts broken away of FIGS. 7 and 8, the level vial support 10 has a first tool holder, generally indicated at 38, and a second tool holder, generally indicated at 40. The tool holders 38, 40 are arranged to retain tools substantially entirely within the exterior surface of the body 16 so that the tools do not significantly protrude from the body when stowed. As shown in FIGS. 4 and 6, access to the tool holders 38, 40 is provided on the side housing member 24. The first tool holder 38 is adapted to hold a stylus 42 (not shown in FIG. 6). The second tool holder 40 is adapted to hold a hex wrench 44 (not shown in FIG. 6). It is to be understood that tools other than those described may be stowed. Depending upon the shape of the particular tool, the shape of the holder may be different to correspond to the shape of the tool. The first tool holder 38 comprises a receptacle 46 (see, FIGS. 6 and 7), a snap-fit connection structure 50 (see, FIGS. 11 and 12), and a finger cavity 54 (see, FIGS. 4, 6 and 7). Similarly, the second tool holder 40 comprises a receptacle 48 (see, FIGS. 6 and 8), a snap-fit connection structure 52 (see, FIGS. 4, 6 and 8), and a finger cavity 56.

The receptacles 46, 48 are formed to slidingly receive their respective tools 42, 44, and, as shown in FIGS. 7 and 8, the receptacles extend within the body 16 generally laterally (along one of the body's lateral axes, which are generally perpendicular to the geomatics pole 12 when the support is mounted thereon). As illustrated in FIGS. 6 and 7, the first receptacle 46 is defined by an opening 58 in the side housing member 24 in combination with a cavity 60 defined by the mating of the lower housing member 20 and the upper housing member 22. Similarly, as illustrated in FIGS. 6 and 8, the second receptacle 48 is defined by an opening 62 in the side housing member 24 in combination with the cavity 60 defined by the mating of the lower housing member 20 and the upper housing member 22. In other words, the first receptacle 46 and the second receptacle 48 are cooperatively defined by the openings (58 and 62, respectively) in the side housing member 24 and the cavity 60.

Figure 11:
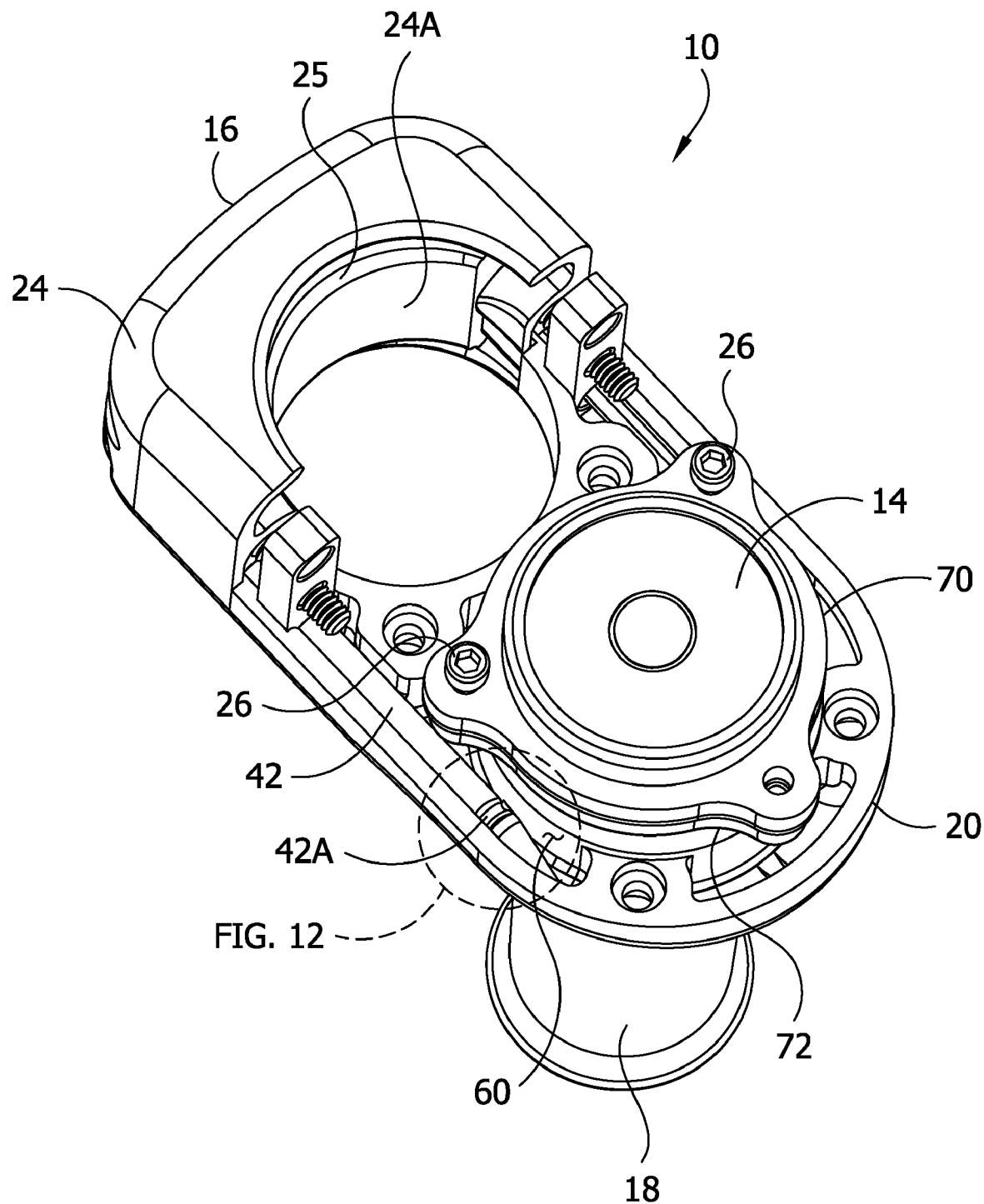
FIG. 11 is a top perspective taken from a slightly higher vantage than FIG. 7 and with an upper housing member of the level vial support removed to show internal construction.
Figure 12:
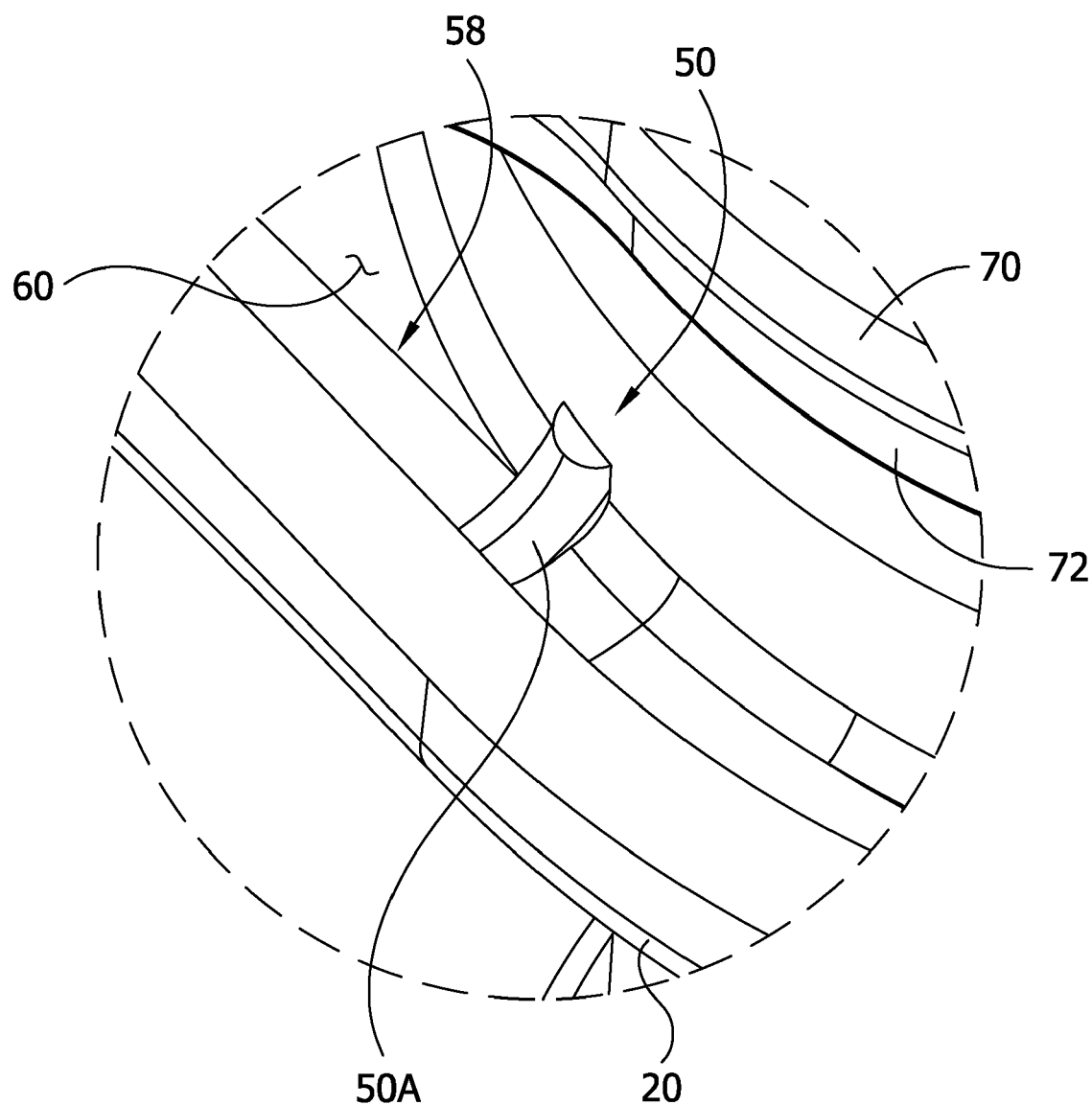
FIG. 12 is an enlarged detail of FIG. 11 showing a snap fit connection structure.

The first and second snap-fit connection structures 50, 52 are formed to releasably retain a tool 42, 44 within their respective receptacles 46, 48. Referring to FIGS. 11 and 12, the snap fit connection structure 50 comprises a generally U-shaped protrusion 50A located within the cavity 60 defined by the lower and upper housing members 20, 22. The stylus 42 has been removed in the enlarged detail that is FIG. 12 to reveal the protrusion 50A. The protrusion snaps into a circumferentially extending recess 42A formed in the stylus 42 when the stylus is inserted into the receptacle 46, and holds the stylus in place. Application of sufficient force will allow the protrusion 50A to snap out of the recess 42A so that the stylus 42 can be removed from the receptacle 46. In the illustrated embodiment, the protrusion 50A is formed from the same material as the lower housing 20, but could be formed separately and from different material within the scope of the present invention. As illustrated in FIG. 6 (not showing the tools 42, 44), the snap-fit connection structure 52 generally comprises opposed protrusions 52A formed as part of the body 16 such that the hex wrench 44 can be inserted between the protrusions 52A, thereby resiliently deforming the protrusions 52A. It will be understood that the protrusions 52A could also be formed separately from the body 16 within the scope of the present invention. Once the tool 44 moves past the protrusions 52A, the protrusions 52A snap back thereby retaining the hex wrench 44 in the receptacle 48. In the illustrated embodiment, the first tool holder 38, which is adapted to stow the stylus 42, has a snap-fit connection structure 50 formed as part of the lower housing member 20. The second tool holder 40, which is adapted to stow the hex wrench 44, has a snap-fit connection structure 52 formed as part of the side housing member 24. However, the second tool holder 40 is configured differently from the first tool holder 38 in that the snap-fit connection structure 52 of the second tool holder 40 is offset from the longitudinal axis of the second receptacle 48. More specifically, because the tail end of the hex wrench 44 is disposed at a ninety-degree angle to the main length of the hex wrench that extends within the receptacle 48, the snap-fit connection structure 52 is disposed to one side of the receptacle 48 to properly grip the tail end of the hex wrench 44. Other ways of releasably securing the tools 42, 44 in the first and second tool holders 38, 40 may be used within the scope of the present invention.

As shown in FIGS. 4 and 6, the finger cavities 54, 56 are designed to facilitate grasping the tools 42, 44 with a finger (not shown) for removing them from their respective receptacles 46, 48. Accordingly, the finger cavities 54, 56 are disposed immediately adjacent to the receptacles 46, 48. Referring to the first tool holder 38 in FIGS. 4, 6 and 7, the finger cavity 54 is disposed below the receptacle 46 so that the fin-like protrusion on the tail end of the stylus 42 may be easily grasped by a finger. As shown in FIGS. 4, 6, and 8, the finger cavity 56 of the second tool holder 40 is disposed between the snap-fit connection structure 52 and the receptacle 48 so that the length of the hex wrench between the snap-fit connection structure 52 and the receptacle 48 may be easily grasped by a finger.

The body 16 of the level vial support 10, excluding the elastomeric pad on engagement surface 24A, the bubble vial 14, and the fasteners 26, 28, 30, are formed from nylon, but it is understood other materials can be used. The body 16 of the illustrated level vial holder 10 is formed using NYLOY MS-0100B, which is available from Nytex Composites Co., Ltd., which has offices in Peitouhsiang, Changhwa County, Taiwan. This material has good strength properties and is resistant to most chemicals. At room temperature, its impact strength is 18.9 ft-lb/in and its hardness is 74 Shore D. It is understood however that the components of the level can be formed from other materials without departing from the scope of this invention.

In one cycle of operation, the level vial support 10 generally begins mounted on a geomatics pole 12, and the stylus 42 and the hex wrench 44 are stowed on the level vial support 10, as illustrated in FIG. 4. More specifically, the stylus 42 is stowed within the first tool holder 38, and the hex wrench 44 is stowed within the second tool holder 40. The snap fit connection structures 50, 52 retain the tools 42, 44 in the receptacles 46, 48 regardless of the orientation of the level vial support 10. When a surveyor wishes to remove the stylus 42 from its holder 38, the surveyor places his finger in the finger cavity 60, applies force to the fin-like protrusion on the tail end of the stylus 42, dislodges the stylus 42 from the snap-fit connection structure 50, and slides the stylus 42 from the receptacle 46. Similarly, when a surveyor wishes to remove the hex wrench 44, the surveyor places his finger in the finger cavity 64, applies force to the length of the hex wrench 44 between the snap-fit connection structure 52 and the receptacle 48, dislodges the tail end of the hex wrench 44 from the snap-fit connection structure 52, and slides the hex wrench 44 from the receptacle 48.

When the surveyor finishes using one of the tools 42, 44 and would like to return the tool 42, 44 to its respective holder 38, 40, the surveyor simply slides the tool into its receptacle 46, 48 and applies sufficient pressure to engage its tail end with its snap-fit connection structure 50, 52. Once replaced in its holder 38, 40, a tool can be safely and conveniently stowed on the level vial support 10 until it is needed in the future. The hex wrench 44 may in one embodiment have multiple uses associated with the level vial support 10. For example, the hex wrench 44 illustrated herein is capable of adjusting the orientation of the bubble vial 14 (as by selectively turning the fasteners 26) for calibration of the bubble vial). The hex wrench 44 is also capable of loosening and tightening the fasteners 30 for changing the location of the level vial support 10 along the geomatics pole 12.

Having described the invention in detail, it will be apparent that modifications and variations are possible without departing from the scope of the invention defined in the appended claims.

When introducing elements of the present invention, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require and particular orientation of the item described.

As various changes could be made in the above level without departing from the scope of the invention, it is intended that all matter contained in the above description or shown in the accompanying drawings shall be interpreted as illustrative and not in a limiting sense.

What is claimed is:

1. A level vial support capable of stowing a tool and being mounted on a geomatics pole, the level vial support comprising;
    a housing adapted for mounting on the geomatics pole,
    a first holder associated with the housing sized and shaped for holding a level indicator,
    a second holder associated with the housing adapted for receiving and holding the tool, the second holder comprising a receptacle extending into the housing, the receptacle being sized and shaped to receive at least a majority of the tool, and
    a third holder associated with the housing for securing and holding another tool, the third holder comprising a receptacle extending into the housing,
    wherein each of the receptacles has a configuration different from the other receptacle for receiving a different shaped tool.

2. A level vial support as set forth in claim 1 wherein the housing has an exterior surface, the receptacle being sized to hold the tool when received therein at least partially within the exterior surface of the housing.

3. A level vial support as set forth in claim 2 wherein the receptacle includes a finger cavity positioned to facilitate engaging the tool with a finger for removing the tool from the receptacle.

4. A level vial support as set forth in claim 1 wherein the receptacle extends generally horizontally within the housing.

5. A level vial support as set forth in claim 1 wherein the housing has an exterior surface, each of the receptacles of the second and third holders are sized to hold a respective one of the tools when received therein at least partially within the exterior surface.

6. A level vial support as set forth in claim 5 wherein each of the receptacles comprises a finger cavity positioned to facilitate engaging the tool with a finger for removing the tool from the respective receptacle.

7. A level vial support as set forth in claim 1 wherein each of the receptacles extend generally horizontally within the housing.

8. A level vial support as set forth in claim 1 wherein each of the receptacles includes a snap fit connection structure adapted to releasably retain a corresponding one of the tools therein.

9. A level vial support as set forth in claim 1 wherein the second holder comprises a snap fit connection structure adapted to releasably retain the tool.

10. A level vial support as set forth in claim 1 wherein the tool adapted for receipt in the second holder is one of a hex wrench and a stylus.

11. A level vial support as set forth in claim 1 in combination with the geomatics pole, the level vial support being mounted on the pole.

12. A level vial support as set forth in claim 1 in combination with the level indicator mounted in the holder.

* * * * *